United States Patent [19]
Procter

[11] 3,969,058
[45] July 13, 1976

[54] APPARATUS FOR MAKING PLASTIC CONTAINERS

[75] Inventor: Brian Procter, Stroud, England

[73] Assignee: Hayssen Manufacturing Co., Sheboygan, Wis.

[22] Filed: Feb. 12, 1975

[21] Appl. No.: 549,280

Related U.S. Application Data

[62] Division of Ser. No. 456,074, March 29, 1974, abandoned.

[30] Foreign Application Priority Data

Apr. 10, 1973 United Kingdom............... 17274/73

[52] U.S. Cl. ...................... 425/242 B; 425/245 R; 425/324 B
[51] Int. Cl.² ........................................ B29D 23/02
[58] Field of Search ............ 425/242 R, 242 B, 245, 425/324 R, 324 B, 407, 418, 455, 810, DIG. 51

[56] References Cited
UNITED STATES PATENTS

| | | |
|---|---|---|
| 3,018,519 | 1/1962 | Morin ............................ 425/DIG. 1 |
| 3,341,644 | 9/1967 | Allen ............................ 425/324 B X |
| 3,471,896 | 10/1969 | Ninneman ...................... 425/326 B |
| 3,566,442 | 3/1971 | Hakala ............................ 425/418 X |
| 3,602,946 | 9/1971 | Curretti ............................ 425/185 |
| 3,868,202 | 2/1975 | Valyi ............................ 425/242 B |

*Primary Examiner*—Francis S. Husar
*Assistant Examiner*—Carl Rowold
*Attorney, Agent, or Firm*—Koenig, Senniger, Powers and Leavitt

[57] ABSTRACT

Methods of and apparatus for making plastic containers with integral rims, utilizing a transfer ring means having an aperture and an annular groove, in which the aperture is closed to define a space for reception of thermoplastic material, which is compressed to form it into a diaphragm with the material filling said groove forming the rim of the diaphragm, the transfer means carrying the diaphragm is positioned on a mold having a cavity corresponding to the shape of the container, the diaphragm is formed into a container in the mold cavity, and the container is removed from the transfer means with the rim of the diaphragm as molded in said groove intact with the container and forming the rim of the container.

8 Claims, 29 Drawing Figures

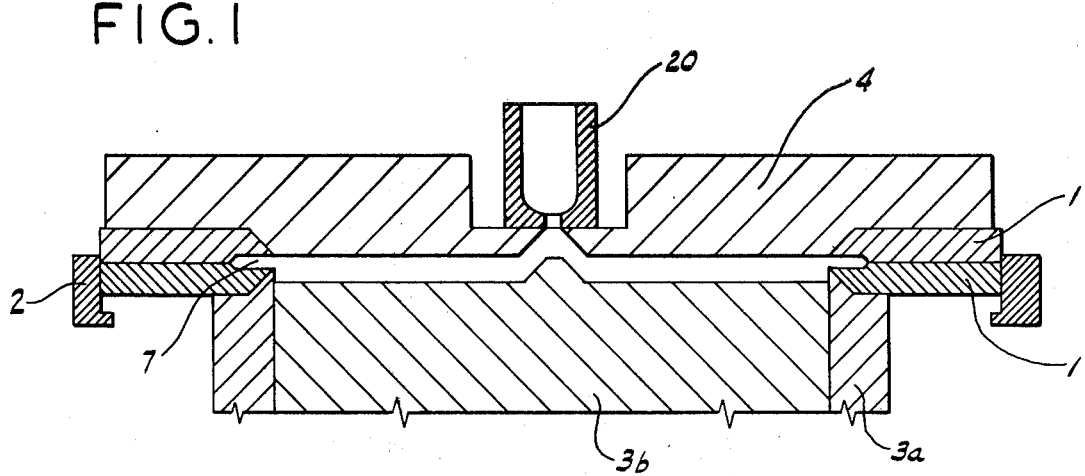
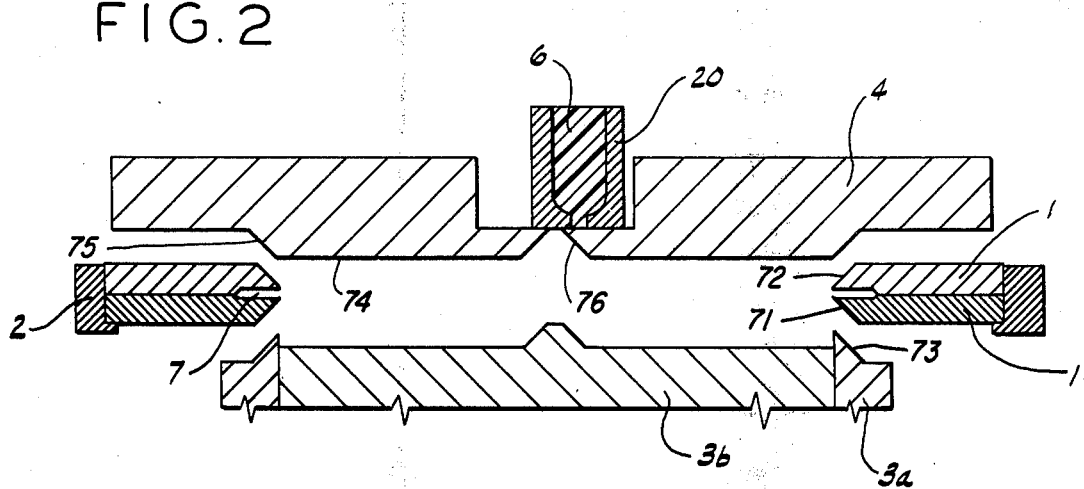
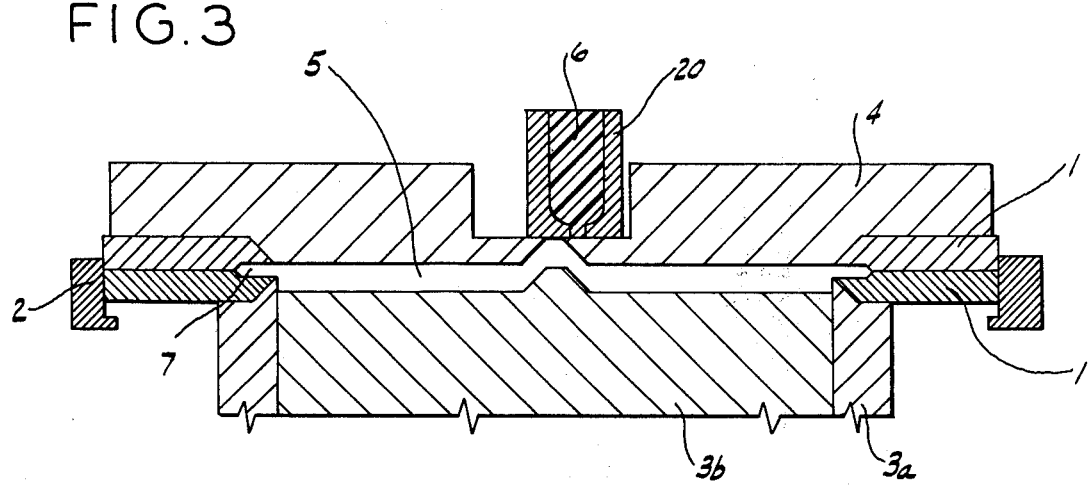

APPARATUS FOR MAKING PLASTIC CONTAINERS

This is a division of application Ser. No. 456,074, filed Mar. 29, 1974, now abandoned.

BACKGROUND OF THE INVENTION

This invention relates to apparatus for making plastic containers, and more particularly to apparatus for making plastic containers with integral rims.

The invention is an improvement upon the invention of U.S. Pat. No. 3,602,946, which generally involves the formation of a diaphragm of plastic material in a transfer ring with the periphery of the diaphragm retained in an internal annular groove of the ring, and the transfer of the ring carrying the diaphragm to a molding station where the diaphragm is molded into a container, followed by the severance of the container from the annulus of the plastic material retained in the groove. This annulus is either discharged as waste, or it is suggested that the next diaphragm to be formed may be welded thereto so as to minimize waste. The latter, however, has not been practical in commercial production.

SUMMARY OF THE INVENTION

Among the several objects of this invention may be noted the provision of improved apparatus for making plastic containers involving the formation of a diaphragm in a transfer means (e.g., a transfer ring) and the transfer of the transfer means to a molding station where the diaphragm is molded into a container, without any waste of the plastic material, and without any severing operation such as above described; and the provision of such improved apparatus for producing containers with integral rims without any waste of plastic material.

In general, apparatus of this invention comprises means for first molding a pre-form and means for then molding the pre-form into a container having an open end. The pre-form molding means comprises a transfer means having opposite sides, an aperture therethrough from one side to the other, and a groove formation surrounding the aperture adapted to receive plastic during the molding of the pre-form and defining the configuration for the open end of the container, whereby the open end of the container is molded as an integral part of the pre-form when the pre-form is molded. The apparatus has a station for the molding of the pre-form with means at this station for closing the aperture in the transfer means comprising a metering plate on one side and a compression means on the other side of the transfer means. The compression means comprises a compression ring and a compression piston movable in the compression ring, the latter having an end engageable with the said other side of the transfer means around said aperture at the location of the groove formation in the transfer means, and being movable relative to the metering plate from an open position relative to the transfer means and the metering plate and a closed position wherein said end of the compression ring engages said other side of the transfer means and clamps the transfer means between the metering plate and the compression ring thereby to form a closed space including the aperture in the transfer means and the said groove formation for the molding of the pre-form. The metering plate has a passage for flow of plastic into said closed space, and means is provided for delivering into said closed space through said passage a volume of thermoplastic plastic less than the volume of said closed space. The compression piston is then movable in and relative to the compression ring in the direction toward the metering plate to compress the plastic in said closed space and form it into the pre-form, with the plastic filling said groove formation thereby to mold the open end of the container which is to be formed from said pre-form as an integral part of the pre-form and also to retain the pre-form in the transfer means.

Other objects and features will be in part apparent and in part pointed out hereinafter.

BRIEF DESCRIPTION OF THE DRAWINGS

FIG. 1 is a view in cross section showing certain parts of an apparatus of this invention in a clamped position;

FIGS. 2–13 show the same and other parts and diagrammatically illustrate successive steps in the operation of a preferred embodiment of this invention;

FIG. 27 illustrates the formation of a plastics material diaphragm or pre-form of non-uniform thickness; and.

Corresponding reference characters indicate corresponding parts throughout the several views of the drawings.

DESCRIPTION OF THE PREFERRED EMBODIMENTS

Figure 4:
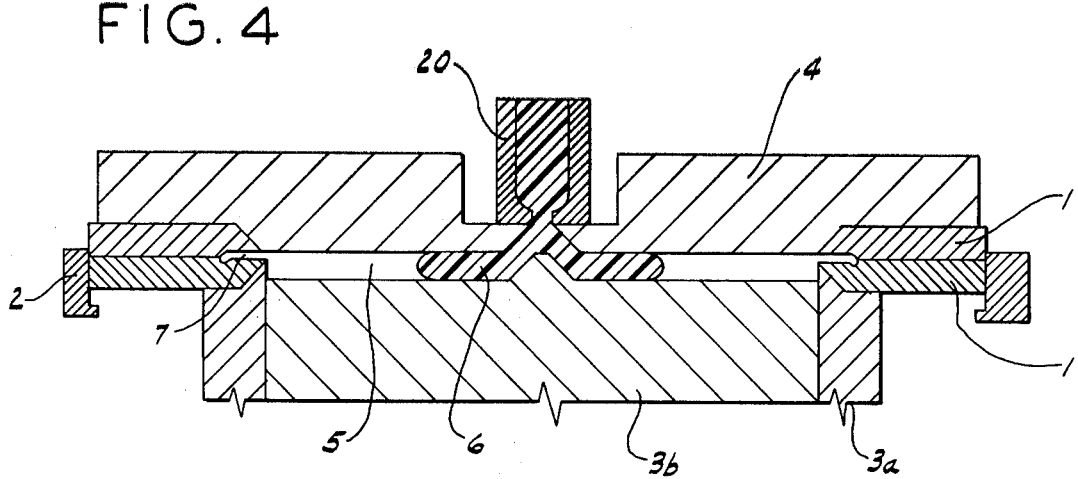

The present invention is an improvement in, or modification of, the invention described and illustrated in U.S. Pat. No. 3,602,946, issued Sept. 7, 1971 (see also British patent specification No. 1,230,282). Accordingly, the description and drawings in the present application are confined principally to the improved or modified features of the processes and apparatus. Reference is directed to the specification of U.S. Pat. No. 3,602,946 for a disclosure of any features which are not fully described or illustrated herein.

The different successive operations in a heat-shaping process in accordance with the invention will now be described with reference to FIGS. 1–13. FIG. 1 illustrates an injection and compression device in a clamped position and shows upper and lower transfer rings 1, a one-piece transfer plate 2 (corresponding to transfer plate 2 shown in U.S. Pat. No. 3,602,946) formed with a recess having an internal lip which can support the rings 1, a compression ring 3a, a compression piston 3b, an injection or metering plate 4 and a conduit 20 affording an injection nozzle through which plastics material in a moldable state is supplied to the cavity defined between the compression piston 3b and the injection plate 4.

FIG. 2 shows the transfer rings 1 having an aperture therethrough. The rings are located in the recess of the transfer plate 2 and are supported from beneath by the aforementioned lip of that plate. The rings 1 occupy a position ready for injection and are placed between the compression piston 3b and the injection or metering plate 4. The injection nozzle conduit 20 is closed in the position shown in FIG. 2 of the drawings. The compression ring 3a and the compression piston 3b are displaced towards the injection plate 4 so that the rings 1 are clamped against the injection plate 4 thus sealing the upper part of the aperture. The rings 1 simultaneously reach a position in which they are substantially coplanar with the top of the ring 3a which ring closes the lower part of the aperture as shown in FIG. 3. The rings 1 and the piston 3b thus form a recess or cavity 5 into which plastics material 6 is introduced through an aperture in the injection plate 4 as shown in FIG. 4.

As the distance between the end face of the piston 3b and the injection plate 4 is small, the plastics material 6 spreads in the recess or cavity 5 which recess or cavity is shaped to mold a thick pad whose diameter, as shown in FIG. 4, will be less than that of the recess or cavity 5 itself. During injection of the plastics material 6 into the recess or cavity 5, a circumferential movement may be imparted to the melt by rotating the compression piston 3b within the ring 3a. The purpose of the circumferential movement is to impart a circumferential as well as a radial orientation whilst the plastic is being injected in order to achieve biaxial orientation in the plastic diaphragm or pre-form which is subsequently formed. The plastics material 6 is thus brought into the form of a thick pad without having been put under higher pressure. This is important as it makes it unnecessary to use a high injection pressure. Simple and conventional injection means may thus be employed to introduce the plastics material into the recess or cavity 5.

Figure 5:
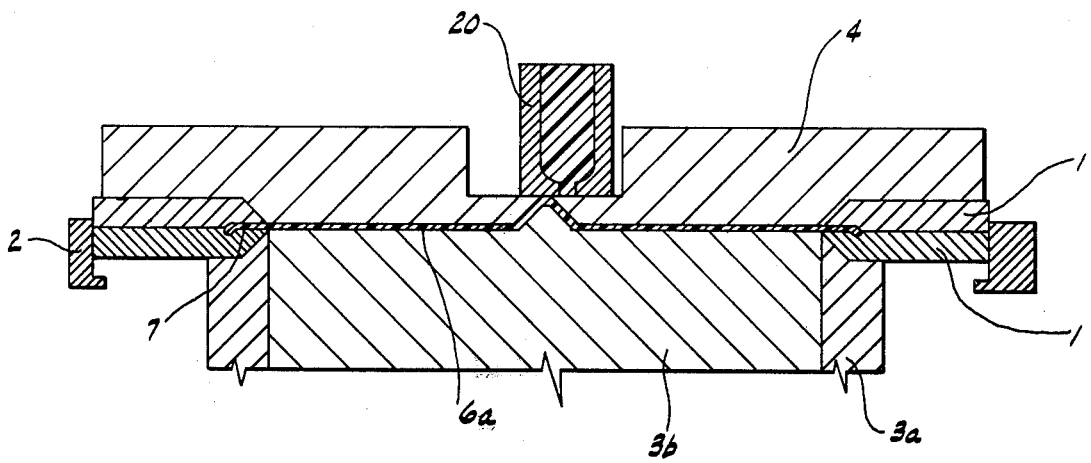

Once the desired amount of plastics material has been introduced into the recess or cavity 5, the conduit 20 affording the injection nozzle is closed and the piston 3b is displaced towards the injection plate 4 so as to close the upper part of the axial aperture in the rings 1 as shown in FIG. 5. The plastics material 6 is highly compressed during this displacement and is formed into a diaphragm or pre-form 6a whose periphery is engaged in a retaining groove 7 formed between radially inner regions of the two rings 1 in order to secure the diaphragm 6a to these rings. A further circumferential movement may be imparted to the material 6 (melt) by rotating the compression piston 3b within the ring 3a during the compression of the pad of material 6 to form the diaphragm 6a. The purpose of this circumferential movement is to impart a circumferential as well as a radial orientation whilst the plastic is being compressed in order to achieve biaxial orientation in the plastic diaphragm 6a.

It should be noted that substantially no force is applied to the transfer plate 2 as the rings 1 are removably located thereon and that, during injection (FIG. 4) and compression (FIG. 5), the rings 1 are held clamped between the compression ring 3a and the injection plate 4. Only the temperature of the piston 3b and the plate 4 has to be controlled to maintain the diaphragm 6a of plastics material at its shaping temperature.

Figure 6:
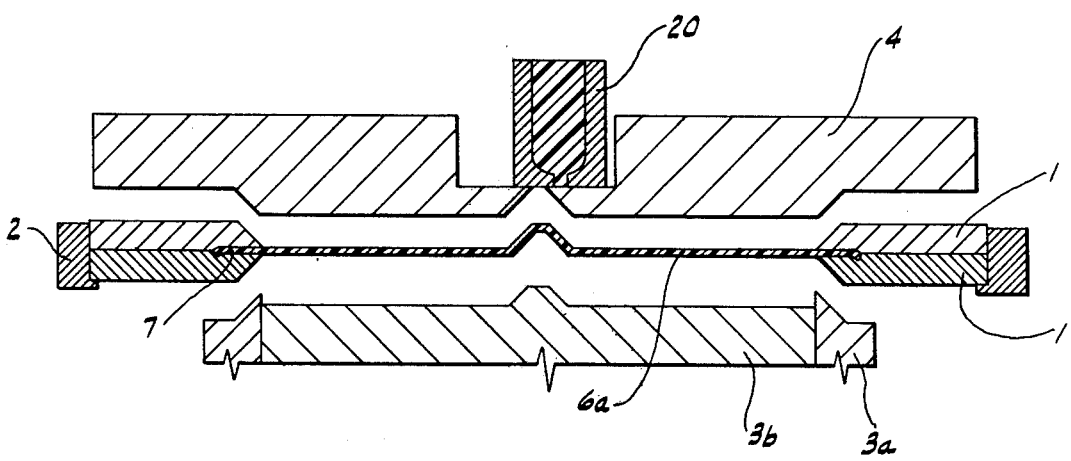

The compression ring 3a and compression piston 3b are then re-lowered as shown in FIG. 6 of the drawings so that the rings 1 resume their normal position in the transfer plate 2 carrying the diaphragm 6a whose periphery is secured in the groove 7 between the rings 1. The diaphragm 6a of compressed plastics material is thus in contact substantially only with the surrounding air which will conduct heat away from the diaphragm only relatively slowly.

The lower ring of the two-part transfer ring 1, 1 has a downwardly flaring seat 71 around the aperture therein, and the upper ring of the two-part transfer ring 1, 1 has an upwardly flaring seat 72 around the aperture therein (see FIG. 2). The compression ring 3a has a flaring upper end 73 engageable with the seat 71 of the lower ring, and the injection plate 4 has a lower portion 74 formed to fit in the aperture in the upper ring and having a flaring periphery 75 engageable by the seat 72 of the upper ring. When the rings 1, 1 are clamped (as shown in FIG. 3) the upper edge of the flare 73 is located generally at the upper edge of the flare 72, and the bottom face of portion 74 of the injection plate is generally in the horizontal plane of the lower edge of the flare 72 (at the top of groove 7). Flare 73 seats and seals against seat 71, and seat 72 seats and seals against flare 75.

Figure 7:
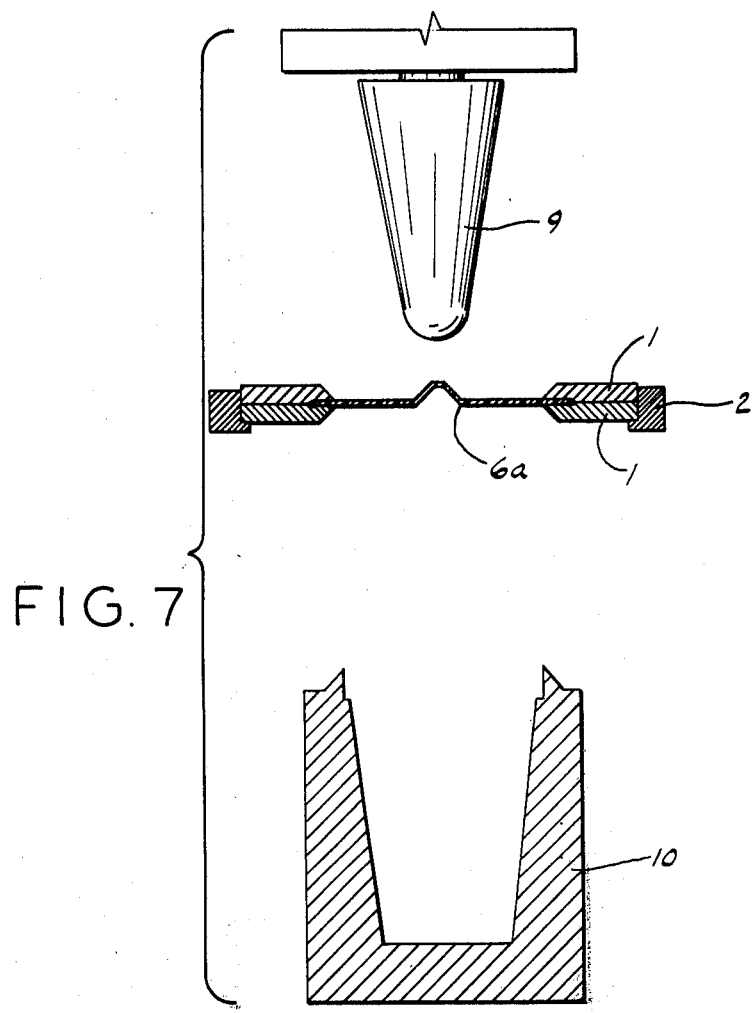
Figure 8:
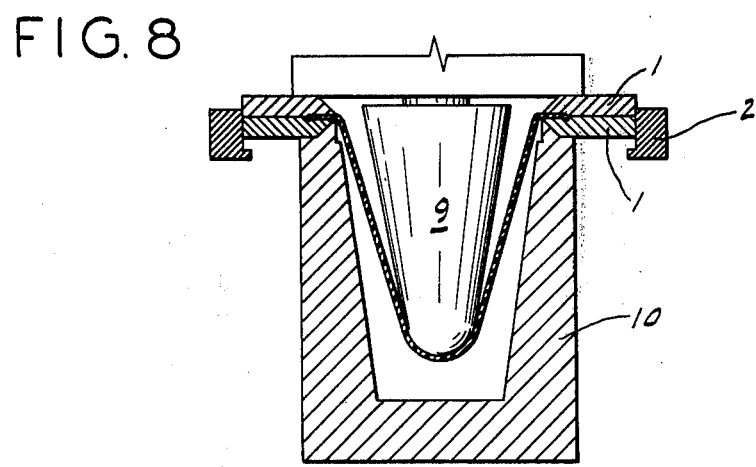
Figure 9:
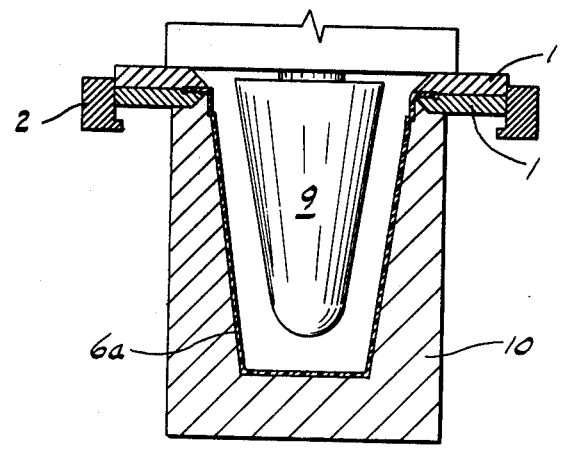
Figure 25:
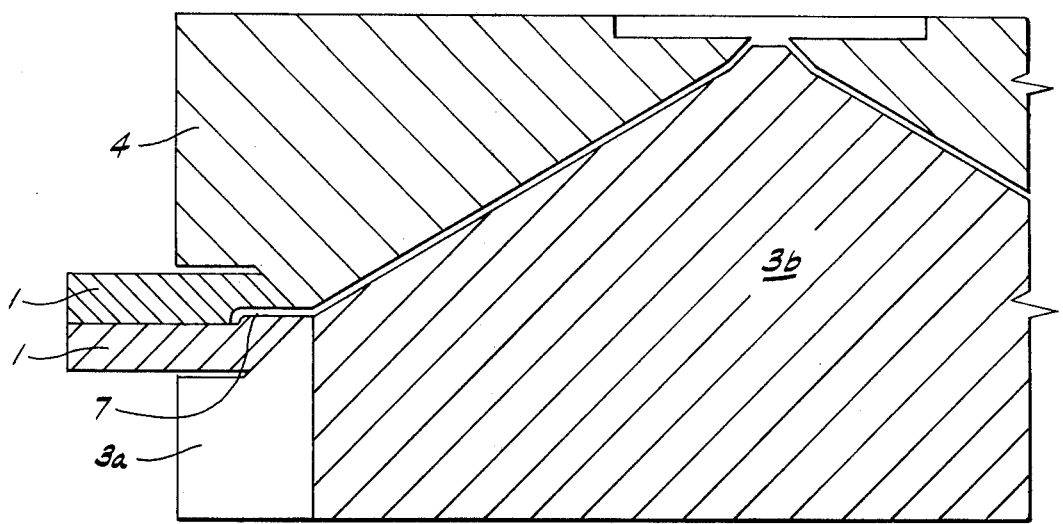
FIGS. 25 and 26 illustrate the formation of non-planar plastics material diaphragms or pre-forms.

FIGS. 7 and 8 of the drawings show a forming station in which the required container is first shaped mechanically after which it is brought to its final form by inflation and/or vacuum shaping as shown in FIG. 9. The shaping device can be of any suitable configuration depending upon the desired shape of the containers. As shown, a die or mold 10 and a punch 9 are arranged at opposite sides of the transfer plate 2 and are located so as to be aligned with the apertures in that plate when it is in one of its rest positions (which are shown in FIG. 25 of U.S. Pat. No. 3,602,946). The punch 9 is displaced through the rings 1 located in the aperture of the plate 2 to draw the diaphragm 6a into the interior of the cavity in the die or mold 10. The diaphragm 6a is then inflated so as to press it against the walls of the mold and form the container (see FIG. 9).

Figure 10:
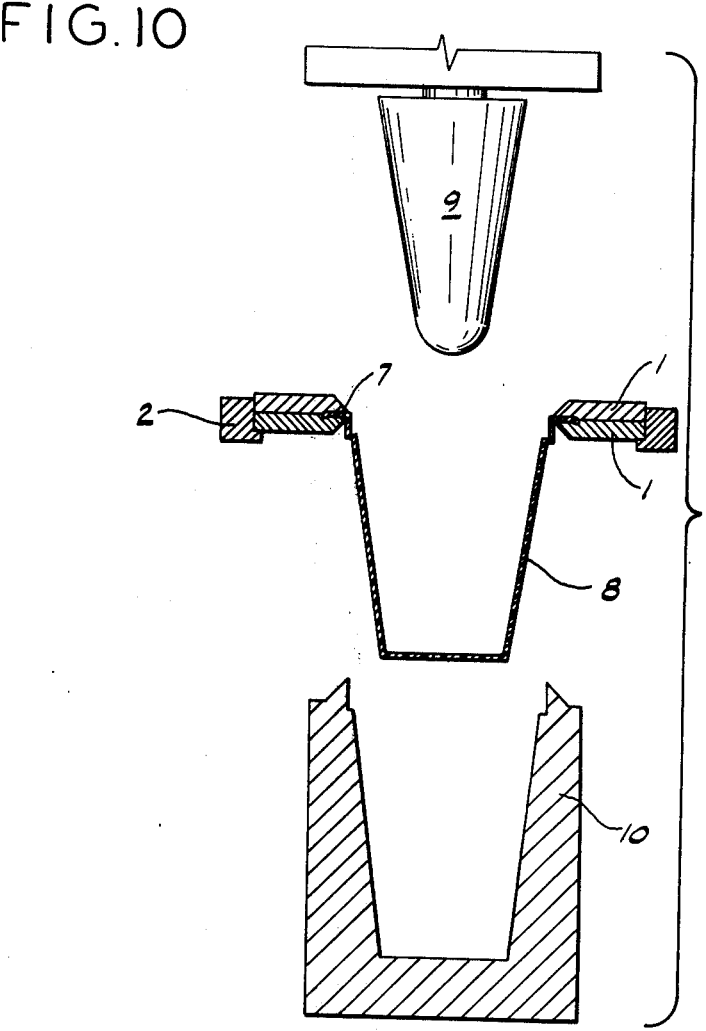
Figure 11:
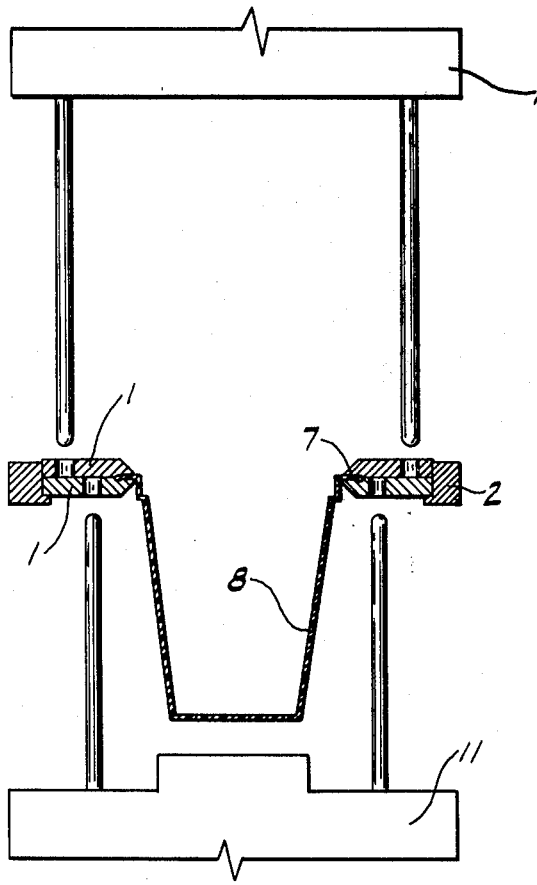
Figure 12:
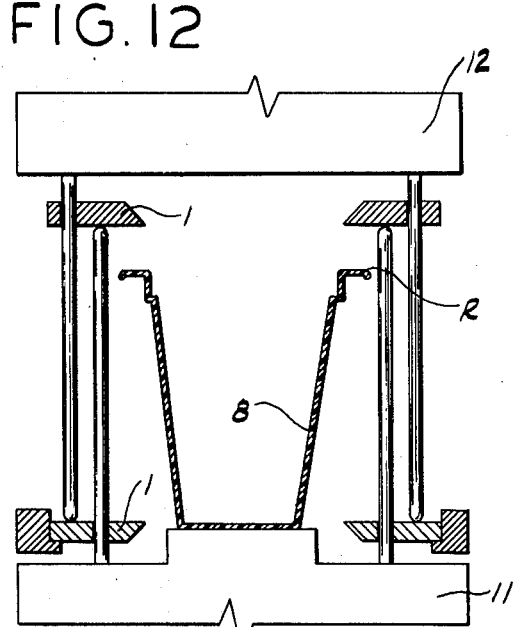
Figure 13:
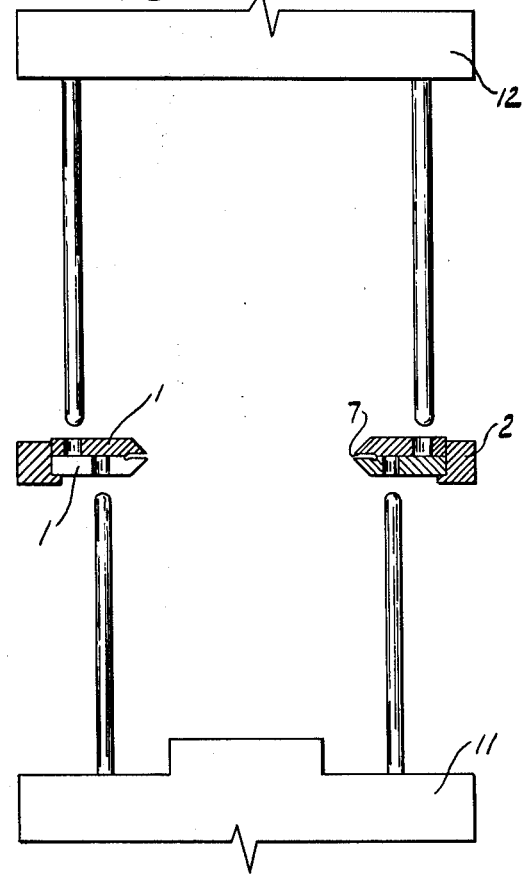

The punch 9 and the die 10 are next moved apart as shown in FIG. 10 of the drawings to allow the transfer plate 2 to move to another operating station taking with it the transfer rings 1 with a formed container 8 attached thereto as shown in FIG. 11. This station is provided with lower and upper abutment assemblies 11 and 12 and relative upward and downward movements of the vertical rods of these move the two rings 1, which are formed with at least two holes each for cooperation with the aligned rods, apart and release the formed container 8 to stand upon the lower abutment assembly 11 as shown in FIG. 12 of the drawings. The container 8 is then ejected by mechanical, pneumatic or other suitable means that are not illustrated. It is emphasized that the described construction insures that the container lips are released and ejected with the corresponding containers 8.

It will be noted from the foregoing that the main points of the process that has been particularly described are:

a. Injection at reduced pressure of a pad of plastics material into a recess or cavity which is shaped to produce two equi-spaced faces on said pad but which does not limit the radial expansion of the pad during introduction of plastics material into the recess or cavity.

b. Compression of the pad of plastics material to mold it into a pre-form in the shape of a diaphragm and simultaneously to cause the diaphragm to be held, at its periphery only, by the transfer rings.

c. Transfer of the diaphragm (the pre-form) to the shaping station.

d. Transfer of the formed container to the ejection station.

e. Elimination or reduction in the volume of plastics material waste.

Waste is substantially completely eliminated where the whole diameter of each plastics material diaphragm is used in the finished container. In such a case, the internal edges of the transfer rings 1 define the final lip shape, i.e. the shape of the open end of the containers 8.

The advantages of the process that has hereinbefore been particularly described as compared with many previously proposed processes are mainly:

a. The substantial elimination or marked reduction in waste which results in lowering the cost price for the manufacture of each container.

b. Reduction in the thickness of the walls of the containers owing to the uniformity of the diaphragm of plastics material from which the containers are produced. It follows that the weight of plastics material used for the production of a given container 8 having required mechanical characteristics is reduced, thus entailing a similar reduction in the cost price of each container.

c. The symmetry between the diaphragm 6a and the finished container 8 enables radial thickness variations to be compression molded into the diaphragm to compensate for the thinning of the angular corners of the finished container which normally occurs when thermoforming from a parallel sided plastics sheet.

d. The preparation of the diaphragms 6a for forming with radially symmetric orientation, thus providing conditions for improved physical properties of the finished containers 8.

e. Accurate dimensioning of the container lips by compression forming into the groove 7 between the transfer rings 1, this feature being most important to insure easy and correct lid fitting.

f. A number of different lip forms (container open end) can be produced by employing appropriately shaped transfer rings 1, this normally requiring the use of separate forming processes in more conventional thermoforming methods or being substantially impossible on some conventional thermoforming lines.

g. Omission of heating and temperature regulation for the transfer device.

h. Simplification of the injection mechanism, injection being effected at a very low pressure which need not be much greater than atmospheric pressure.

i. Construction of a transfer device which is not subjected to forces due to compression, injection or shaping of the plastics material. This is due to the construction and arrangement of the transfer rings which are mounted freely on the transfer plate 2 to which they do not transmit any significant forces.

j. Finally, the process can be used for substantially any type of heat-shaping such as mechanical, pneumatic, pressure-shaping, vacuum-shaping with or without counter-blowing and so on as the shaping station is independent of the remainder of the apparatus. Consequently, the most suitable shaping process can be selected depending on the configuration of the container that is to be made and upon the particular plastics material that is to be used. A method of shaping which is particularly well adapted to the present process is described in British patent specification No. 972,488.

One preferred heat-shaping apparatus for use in the present invention comprises a transfer device in which the transfer plate 2 is a rotary plate (as in U.S. Pat. No. 3,602,946) provided with apertures which are distributed uniformly on a circumference close to the periphery of the plate, said apertures being arranged to receive the transfer bodies that are afforded by the rings 1. The rings 1 can be indexed into simultaneous alignment with three stations which comprise the injection and compression station illustrated in FIG. 1, the shaping station illustrated in FIG. 7 and the ejection station that is illustrated in FIG. 11.

Figure 26:
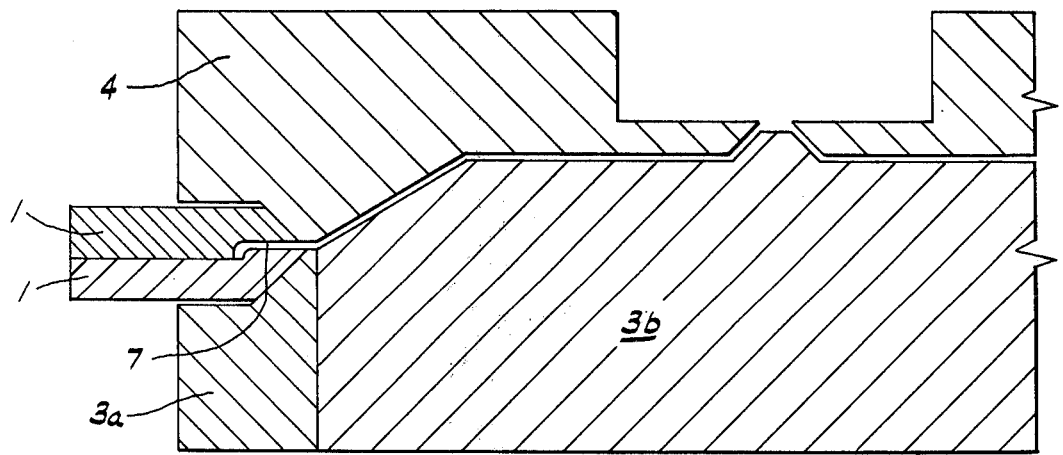
Figure 27:
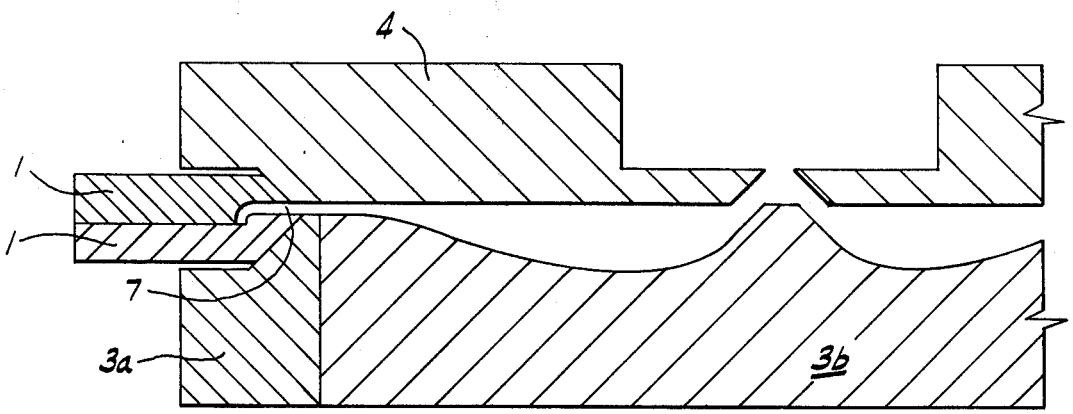

The process that has been described above can take place by rotating the transfer plate 2 in a step-by-step manner so as to convey the transfer rings 1, in turn, to each of the three stations that have just been mentioned. It will be apparent that, when the injection and compression device that has been described with reference to FIG. 1 of the drawings is employed, the plate 2 is brought to a corresponding angular position in which one of the apertures therein has its center in line with the compression ring 3a and the compression piston 3b. The free face of the injection plate 4 is flat apart from the provision of an injection passage or orifice constituted by a hole 76 at its center, said orifice or hole 76 having a diameter of not less than 2 millimeters and being supplied with plastics material in a moldable state by the conduit 20 that affords the injection nozzle. Shut-off of the nozzle outlet of the conduit 20 after the injection of plastics material is achieved by moving said conduit laterally to bring it out of register with the injection orifice in the plate 4. This movement has a slicing action through the plastics material and, in the closed position of the conduit 20, a flat end face of the conduit 20 that surrounds the injection aperture therein is brought into closing register with the injection orifice or hole 76 in the plate 4. This condition is illustrated in FIG. 5 of the drawings. FIGS. 25 and 26 of the drawings illustrate alternative constructions in which the compression-formed plastics pre-form is of non-planar configuration but in which the thickness of the pre-form remains substantially uniform throughout its area. FIG. 27 of the drawings illustrates a construction in which the pre-form is of non-uniform thickness and non-planar formation, its lip also being of reduced thickness as compared with the remainder thereof. The arrangements shown in FIGS. 25–27 of the drawings are only examples of many different pre-form shapes that are possible. As illustrated, the hole 76 is formed of frusto-conical shape. Plastic compressed in the hole constitutes part of the pre-form and is separable with the pre-form from the metering plate 4.

The compression piston 3b may have its temperature controlled by the circulation therethrough of a heating or cooling fluid in at least one radial zone thereof to bring the diaphragm 6a to the correct container-forming temperature throughout its area. For a given plastics material and a desired diaphragm thickness (volume of plastics material), the temperature of the parts 3b and 4, the distance between them when the plastics material is injected, the speed of injection, and the residence time for cooling, are critical parameters which can be determined experimentally depending on the particular operating circumstances. Optimization of these parameters is effected on the basis of the result obtained when shaping a diaphragm, i.e. upon the quality of the container that is produced.

The transfer of one of the diaphragms 6a into the shaping device can be effected in one or more successive steps corresponding to successive angular displacements of the plate 2 according to the relative position of the injection and compression devices and the shaping device. The time taken to transfer the diaphragm 6a may be controlled to vary the extent of cooling of the diaphragm by contact with air between the compression and forming stations. This time will depend on the difference in temperature necessary for forming the plastics material and upon the temperature thereof at the instant of release from the compression station. It is obvious that a number of injection-compression, shaping and ejection cycles can be carried out simultaneously. In fact, for each angular rest position of the transfer plate 2, the injection-compression, shaping and ejection operations can be carried out simultaneously by different transfer rings 1.

To increase the speed of container production, the apparatus can include a plurality of injection-compression, shaping and ejection devices which cooperate with a single transfer plate 2. Likewise, displacement of the transfer plate 2 could be linear rather than circular if the devices which cooperate with the transfer rings 1 that are carried by said plate are located correctly with respect to the rest positions of the transfer plate 2. Additionally, the transfer rings 1 have been described as being circular but their shapes when seen in plan can be other than circular. The transfer rings 1 could, for example, be oval or oblong when it is desired to produce a container of a particular shape or when a number of containers are to be shaped simultaneously from a single diaphragm of plastics material by means of a shaping tool having a plurality of punches and dies. In such cases, the shapes of the parts 3a, 3b and 4, the shaping tool and the shearing means would have to match the transfer rings 1.

FIGS. 14, 15, 15a, 16 and 17 of the drawings illustrate alternative embodiments of the injection and compresson device in which the transfer rings 1 are single units instead of being afforded by separated upper and lower rings 1 as described above. In the construction shown in FIGS. 14 and 16 of the drawings, a single upper carrier ring 1a is employed and the plastics diaphragm is retained in that ring during transfer by the use of a reverse taper 42. When the diaphragm reaches the forming station shown in FIG. 16, the container is formed below the single carrier plate and the upper lip of a forming cavity 43 is used to clamp the diaphragm during the forming operation.

Figure 15:
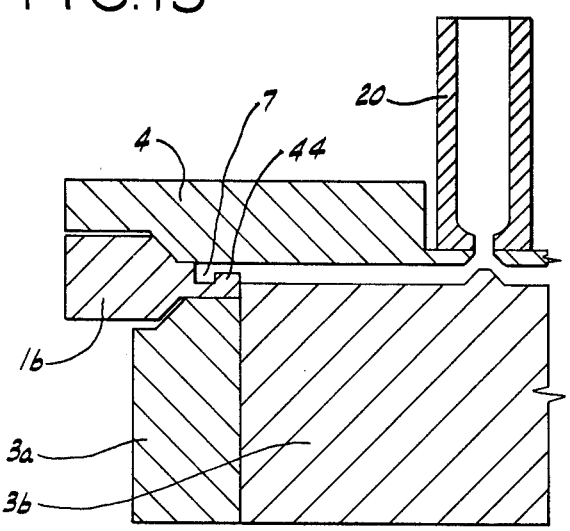
FIG. 15 illustrates another modification having a single transfer body.
Figure 15A:
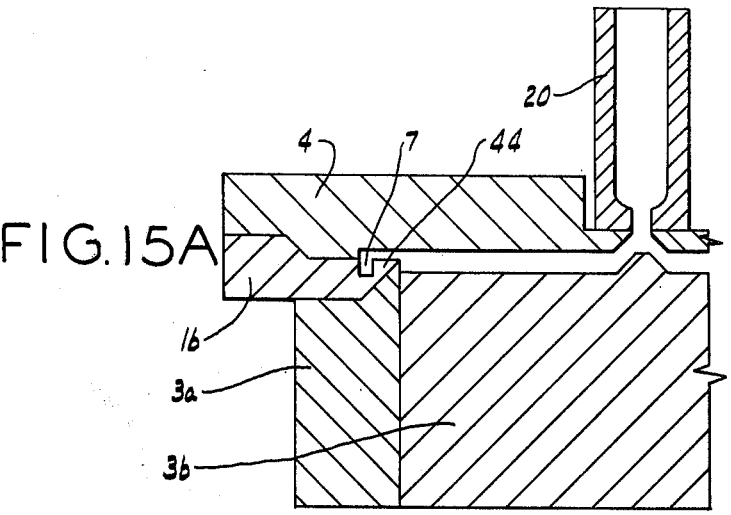
FIG. 15a is a view similar to FIG. 15 showing a modification of FIG. 15.
Figure 16:
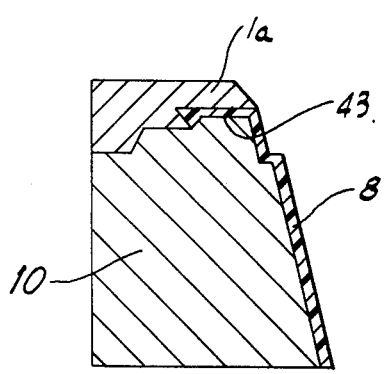
FIG. 16 is a view showing a step in the method utilizing the single transfer body of FIG. 14.
Figure 17:
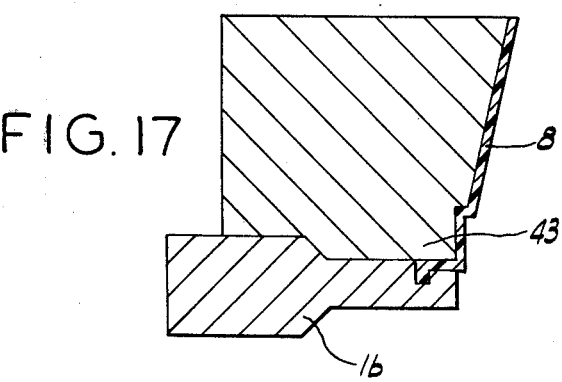
FIG. 17 is a view showing a step in the method utilizing the single transfer body of FIG. 15.
Figure 18:
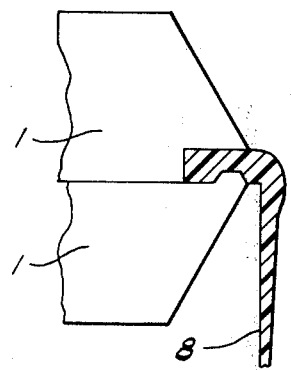
FIGS. 18–24 are sectional views showing parts of alternative embodiments of the internal edges of transfer bodies.
Figure 22:
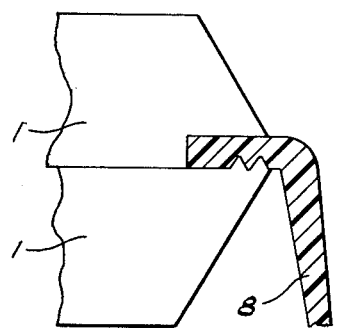
Figure 19:
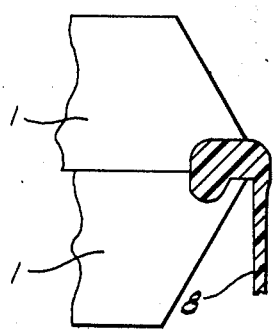
Figure 23:
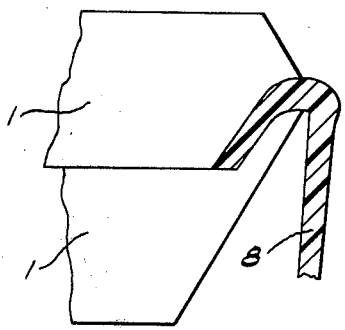
Figure 20:
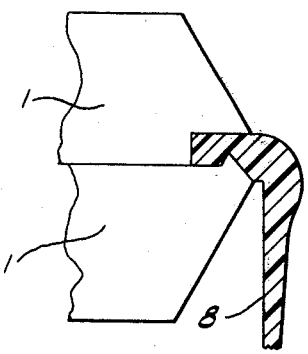
Figure 24:
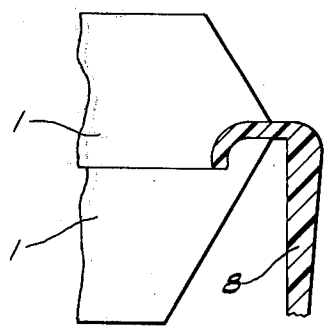
Figure 21:
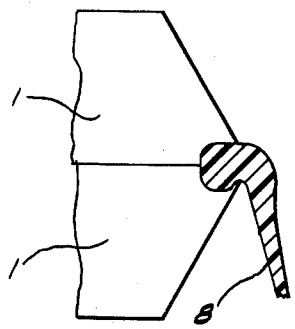

In the constructions shown in FIGS. 15, 15a and 17, a single lower carrier ring 1b is used and the diaphragm of plastics material is retained in that ring, during transfer, by engagement with a raised edge or lip 44 thereof. FIGS. 15 and 15a show two slightly different configurations of the raised edge 44 which will result in corresponding configurations of the lip of the diaphragm but, in either case, when the diaphragm reaches the forming station shown in FIG. 16, the container is formed above the single carrier plate and the lower lip of the forming carrier 43 clamps the diaphragm in position during the forming operation.

FIGS. 18–24 of the drawings all show, in cross section, examples of various container lip configurations that can be produced by employing appropriately shaped transfer rings 1. It will be evident from FIGS. 18–24 of the drawings that all of the diaphragm lips will be effectively retained in the cavities afforded between the radially inner edges of the upper and lower rings 1 until those rings are parted in the manner shown in FIG. 12 of the drawings, immediately prior to ejection of a formed container.

Figure 14:
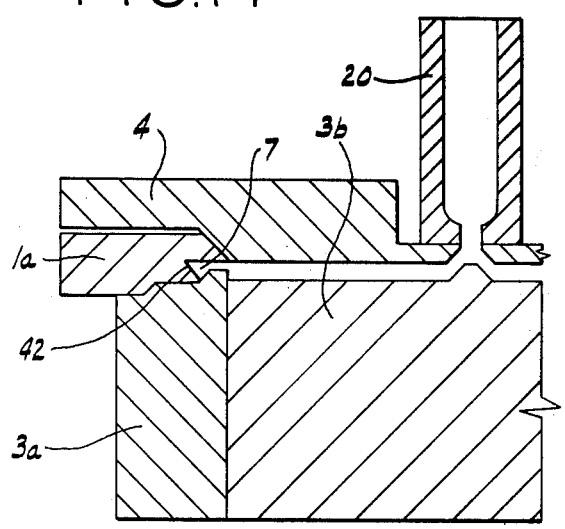
FIG. 14 illustrates a modification having a single transfer body.

From the above, it will appear that the invention basically involves the utilization of a transfer means having an aperture and a groove formation 7 surrounding the aperture, this transfer means being constituted, for example, by the two rings 1 of FIGS. 1–13 or the single ring 1a of FIGS. 14 and 16 or the single ring 1b of FIGS. 15, 15a and 17 and a. The closing of the aperture to define a space (e.g., the space 5) for reception of the thermoplastic material 6;
b. The introduction into said space of a volume of the thermoplastic material less than the volume of said space (as shown, for example, in FIG. 4);
c. The compression of the material (as by piston 3b) in said space to form it into a pre-form such as a diaphragm (6a) with the material filling the groove formation (e.g., the groove 7 of rings 1) and forming the rim of the pre-form and retaining the diaphragm in the transfer means;
d. Positioning the transfer means carrying the pre-form on a mold (e.g., the mold 10 shown in FIGS. 7–10) having a cavity corresponding to the shape of the container;
e. Forming the pre-form into a container in the mold cavity, as shown, for example in FIGS. 8 and 9; and
f. Removing the container from the transfer means, as shown, for example, in FIG. 12, with the rim of the pre-form (indicated at R in FIG. 12) as molded in the said groove intact with the container and forming the rim (the open end) of the container.

Step (a) is carried out as shown in FIG. 1, for example, via the injection or metering plate 4 on the upper side and the compression piston 3b on the lower side of the transfer means, and step (c) by the upward movement of the compression piston 3b. In the case where the transfer means comprises the two axially separable rings 1, the container is removed by axially separating the two rings 1 and moving one of them (the upper ring) axially upwardly relative to the container away from the top of the rim R of the container to a position above the rim R of the container and the other (the lower ring) axially downwardly to the container away from the bottom of the rim to a position such as shown in FIG. 12 wherein the rings are spaced a distance greater than the height of the container, the upper ring is above the container and the lower ring is sufficiently clear of the bottom of the container to enable the container to be removed laterally between the rings. This positions the rings 1 clear of the ends of the container so that it may be ejected laterally. In the case where the transfer means comprises the single transfer ring 1a with the reverse tapered or undercut groove in the bottom side of the transfer ring, the aperture in the transfer ring is closed on the top by the injection plate 4 and on the bottom by the compression ring 3a and compression piston 3b in the compression ring, the rim of the diaphragm (and rim of the container) is formed in the groove 7 between the transfer ring and the compression ring as shown in FIG. 14, and the transfer ring is applied to the upper end of the mold as appears in FIG. 16 with the rim of the diaphragm clamped between the transfer ring 1a and the upper end of the mold 9. The rim of the completed container may be removed from the undercut groove by pushing it downwardly out of the groove. In the case where the transfer means comprises the single transfer ring 1b with the groove in the upper side of the transfer ring, the aperture in the ring is closed as before by the injection plate 4 on top and the compression ring 3a and compression piston 3b on the bottom, the rim of the diaphragm is formed in the groove 7 between the transfer ring and the injection plate as shown in FIG. 15, or FIG. 15a, and the transfer ring is applied to the lower end of the mold as appears in FIG. 17 and the rim of the diaphragm is clamped between the transfer ring and the lower end of the mold.

Figure 28:
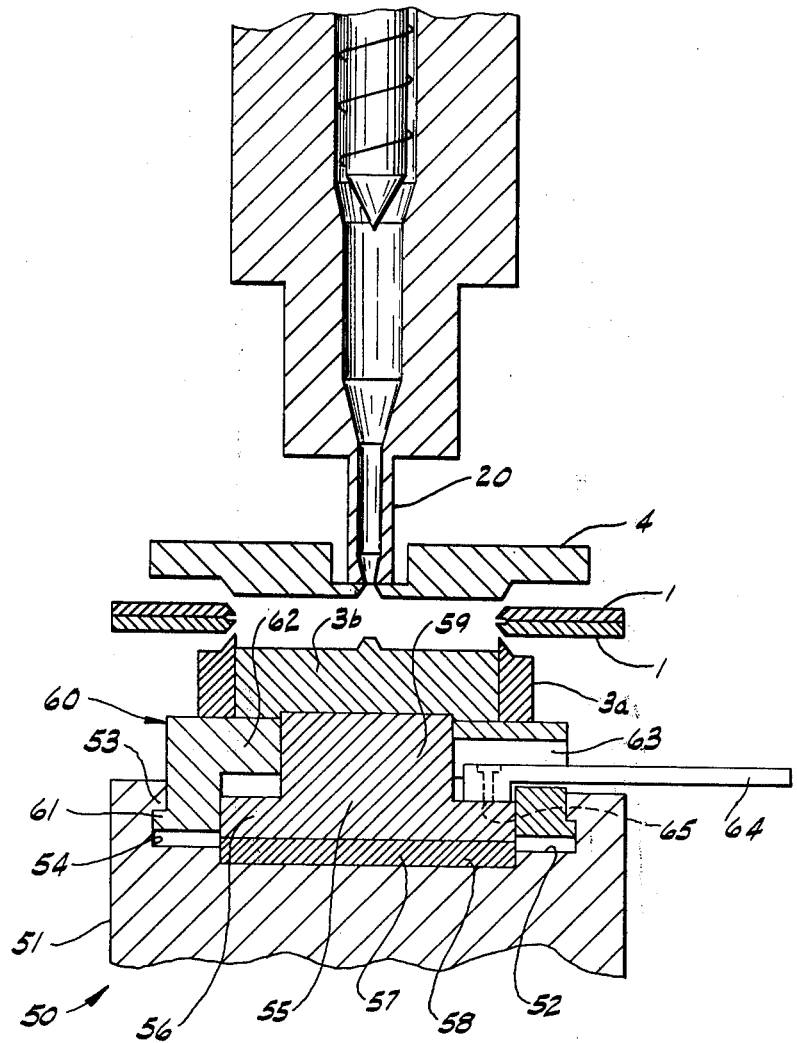
FIG. 28 is a view showing a modification wherein a circumferential movement is imparted to plastic material as it is introduced and compressed to form a diaphragm or pre-form in a transfer body.

Reference has been made above to imparting a circumferential movement to the melt (plastic material) during its injection into the recess or cavity 5 and again while it is being compressed for biaxial orientation. FIG. 28 shows means for carrying this out by rotating the compression piston 3b within the compression ring 3a. This piston and ring are components of a so-called compression head 50 which is movable upwardly from the lowered position in which it is shown in FIG. 28 for engagement of the compression ring 3a with the transfer rings 1 and then for further upward movement for compression of the next to form the diaphragm. The compression head 50 comprises a block 51 having a cylindric recess 52 at the top with an inwardly directed annular flange 53 at the top of the recess providing an annular groove 54 below the flange. At 55 is indicated a compression piston support having a circular base 56 rotatable on a disk 57 of antifriction material (constituting a thrust bearing) seated in a circular recess 58 in the base of recess 52. The compression piston support 55 has a stem 59 extending upwardly from its base 56, the compression piston 3b being suitably secured coaxially on the upper end of the stem 59. At 60 is indicated a support for the compression ring 3a, this support comprising a cylindrical body having a sliding fit in the annular flange 53, an outwardly extending annular flange 61 at its lower end under the flange 53 and an inwardly extending flange 62 at its upper end, stem 59 having a sliding fit in the flange 62. The support 60 is adapted for limited vertical sliding movement relative to the block 51 and the support 55, and carries the compression ring 3a on its upper end with the compression ring held centered by the compression piston 3b. The arrangement is such that on upward movement of the compression head 50, the compression ring 3a engages the lower transfer ring 1 and then pushes both transfer rings 1 upward to clamp them against the injection plate as appears in FIG. 1. At this point, the upper face of the compression piston 3b is down below the top of the compression ring as shown in FIG. 1 for injection of the melt. After injection of the melt (as in FIG. 4), the compression head 50 is moved farther upward to move the compression piston support 55 and the compression piston 3b upwardly for compression of the melt to form the diaphragm (as shown in FIG. 5). The stem 59 slides up within the flange 62 and the compression piston 3b slides up within the compression or clamp ring 3a. The compression ring support 60 is formed with a lateral slot 63 extending radially inward from its outer periphery over the base 56 of the compression piston support 55, and a lever 64 having its inner end secured at 65 to base 56 extends radially outwardly through this slot. This lever is manipulable to effect the rotation of the compression piston support 55 and the compression piston 3b for the circumferential orientation of the plastic. The slot may allow, for example, about a 30° swing of the lever 64 and rotation of the piston 3b.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for making plastic containers comprising means for first molding a pre-form and means for then molding the pre-form into a container having an open end, said pre-form molding means comprising a transfer means having opposite sides, an aperture therethrough from one side to the other, and a groove formation surrounding the aperture adapted to receive plastic during the molding of the pre-form and defining the configuration for the open end of the container whereby said open end of the container is molded as an integral part of the pre-form when the pre-form is molded, said apparatus having a station for the molding of the pre-form, means at said station for closing the aperture in said transfer means comprising a metering plate on one side and a compression means on the other side of said transfer means at said station, said compression means comprising a compression ring and a compression piston movable in the compression ring, said compression ring having an end engageable with the said other side of the transfer means around said aperture at substantially the location of the groove formation in the transfer means, said compression ring being movable relative to the metering plate from an open position relative to the transfer means and the metering plate and a closed position wherein said end of the compression ring engages said other side of the transfer means and clamps the transfer means between the metering plate and the compression ring thereby to form a closed space including the aperture in the transfer means and said groove formation for the molding of the pre-form, said metering plate having a passage for flow of plastic into said closed space, means for delivering into said closed space through said passage in the metering plate a volume of thermoplastic plastic less than the volume of said closed space, said compression piston then being movable in and relative to said compression ring in the direction toward the metering plate to compress the plastic in said closed space and form it into the pre-form with the plastic filling said groove formation thereby to mold the open end of the container which is to be formed from said pre-form as an integral part of the pre-form and also to retain the pre-form in the transfer means.

2. Apparatus as set forth in claim 1 wherein said passage comprises a hole in the metering plate, and said delivery means comprises a nozzle movable laterally between a delivery position for delivery of the plastic through said hole and a shut-off position wherein the nozzle is closed by the metering plate and closes said hole to close said space for the compression of the plastic by said compression piston, said hole opening directly into the said space and formed so that plastic compressed in said hole constitutes part of the pre-form and is separable with the pre-form from the metering plate.

3. Apparatus as set forth in claim 1, wherein the groove formation of the transfer means is configured to form an outwardly projecting rim for the container, and wherein the transfer means carrying the pre-form is movable to a molding station at which it is positionable on a mold having a cavity corresponding to the shape of the container for forming the pre-form into a container in the mold cavity, the transfer means comprising an upper part and a lower part which are separable axially with respect to the container for separation of said rim from said parts, the upper part being formed to form the top of the rim and the lower part being formed to form the bottom of the rim, said parts being axially separable by relatively moving said upper part away from the top of the rim and the lower part away from the bottom of the rim and to a position wherein said parts are spaced a distance greater than the height of the container and the said lower part is sufficiently clear of the bottom of the container to enable the container to be removed laterally between said parts.

4. Apparatus as set forth in claim 3 wherein the transfer means comprises an upper ring and a lower ring which are axially separable, said apparatus having pin means for moving the upper ring axially relative to the container to a position above the rim and the lower ring axially relative to the container to a position below the bottom of the container.

5. Apparatus as set forth in claim 4, wherein the lower ring has a downwardly flaring seat and the upper ring has an upwardly flaring seat around said aperture, the compression ring having a flaring upper end engageable with the seat of the lower ring and the metering plate having a lower portion formed to fit in the aperture in the upper ring and having a flaring periphery engageable by the seat of the upper ring.

6. Apparatus as set forth in claim 1, wherein the transfer means comprises a single transfer ring having said groove formation on the said other side thereof.

7. Apparatus as set forth in claim 6, wherein the groove formation comprises a reverse tapered groove.

8. Apparatus as set forth in claim 1, wherein the transfer means comprises a single transfer ring having said groove formation on the said one side thereof.

* * * * *